United States Patent [19]

Sano et al.

[11] Patent Number: 5,332,165
[45] Date of Patent: Jul. 26, 1994

[54] TRANSMISSION CABLE TERMINATION BOX, AND TRANSMISSION CABLE INSTALLATION AND RECOVERING METHOD

[75] Inventors: Hiroaki Sano; Yoshinobu Kitayama; Shigeru Tanaka, all of Kanagawa; Shigeru Tomita; Hiroyuki Akimoto, both of Ibaraki, all of Japan

[73] Assignees: Sumitomo Electric Industries, Ltd., Osaka; Nippon Telegraph & Telephone Corporation, Tokyo, both of Japan

[21] Appl. No.: 865,612

[22] Filed: Apr. 9, 1992

[30] Foreign Application Priority Data

Apr. 10, 1991 [JP] Japan .................. 3-104832
May 25, 1991 [JP] Japan .................. 3-149801
Jun. 12, 1991 [JP] Japan .................. 3-167701
Dec. 20, 1991 [JP] Japan .................. 3-355928

[51] Int. Cl.⁵ .............................. G02B 6/44
[52] U.S. Cl. ................. 254/134.3 R; 242/556; 242/593; 385/103; 57/18
[58] Field of Search ............ 242/54 R, 56.9; 57/10, 57/13, 16, 17, 18; 385/100, 103

[56] References Cited

U.S. PATENT DOCUMENTS

| | | | |
|---|---|---|---|
| 2,237,062 | 4/1941 | Schlums | 57/18 |
| 2,242,376 | 5/1941 | Stoker | 57/18 |
| 2,533,460 | 12/1950 | Huck | 57/18 |
| 3,474,183 | 10/1969 | Kelly et al. | 174/41 |
| 3,668,851 | 6/1972 | Heinzmann et al. | 57/18 |
| 4,062,608 | 12/1977 | Pierce | 339/5 RL |
| 4,709,542 | 12/1987 | Krafft | 57/13 |
| 4,832,442 | 5/1989 | Pappas | 350/96.23 |

FOREIGN PATENT DOCUMENTS

| | | |
|---|---|---|
| 0296860 | 12/1988 | European Pat. Off. . |
| 0343057 | 11/1989 | European Pat. Off. . |
| 1942087 | 3/1970 | Fed. Rep. of Germany . |
| 3024220 | 1/1982 | Fed. Rep. of Germany . |
| 62-175387 | 8/1987 | Japan . |
| 1043469 | 2/1989 | Japan . |

OTHER PUBLICATIONS

C. N. Carter et al., The Development of Wrap-on Optical Cables for Use on the Earthwires of High Voltage Powerlines' International Conference on Large High Voltage Systems, Paris, 28th Aug. 1988 pp. 1-6.

*Primary Examiner*—Daniel P. Stodola
*Assistant Examiner*—John Q. Nguyen
*Attorney, Agent, or Firm*—Cushman, Darby & Cushman

[57] ABSTRACT

A method for installing and recovering transmission cable. A termination box has a stationary winding barrel having a central axis, and a transmission cable guide rotatably coupled to the stationary winding barrel for guiding a transmission cable onto and from the stationary winding barrel by being rotated around the central axis. Various methods show the step for winding and unwinding transmission cable from the termination box; as well as, use of the termination box in conjunction with a strength wire to install transmission cables between a transmission supply point and a transmission receiving point or points.

2 Claims, 12 Drawing Sheets

TRANSMISSION CABLE TERMINATION BOX, AND TRANSMISSION CABLE INSTALLATION AND RECOVERING METHOD

BACKGROUND OF THE INVENTION

1. Field of the Invention

This invention relates to a transmission cable termination box, and a transmission cable installation and recovery method which is employed when installing transmission cables such as copper wire cables and optical fiber cables.

There is a strong demand to simplify the transmission cable installation process because of increasing use of transmission cables, such as optical fiber cables, in the communications industry. Transmission cables are often required to span great distances. In a conventional installation method, optical fiber cables are fused together to provide a transmission cable of the required length. Another installation method, uses optical fiber cables with connectors at the optical fiber cable ends. Optical fiber cables with connectors are delivered to a work site where they are connected to provide a transmission cable of sufficient length. The resulting transmission cable is often longer than required, and the extra transmission cable length must be dealt with.

It is not practical to produce transmission cables, such as optical fiber cables or copper wire cables, of different lengths to accurately obtain the exact length of the transmission cable required for a given installation. Therefore, techniques for accommodating the extra length of transmission cable have been developed.

2. Description of the Prior Art

When installing a transmission cable such as a copper wire cable or optical fiber cable, a predetermined length transmission cable is accommodated in a termination box. The cable is laid by being dram out of a working side of the termination box.

European Patent Application (OPI) No. 0296860 discloses an optical fiber cable accommodating container wherein the optical fiber cable is placed in the container by utilizing the cable's own weight to drop the cable into the container. During installation the optical fiber cable is pulled out of the container.

FIGS. 18 through 20 are explanatory diagrams showing a transmission cable accommodating unit disclosed by European Patent Application No. 0296860. More specifically, FIG. 18 is an explanatory diagram showing a transmission cable which is being accommodated within the transmission cable accommodating unit. FIG. 19 is an explanatory diagram showing the transmission cable which has been accommodated within the transmission cable accommodating unit. FIG. 20 is an explanatory diagram showing the transmission cable being pulled out of the transmission cable accommodating unit. In FIGS. 18 through 20, reference numeral 91 designates the transmission cable; 92, the transmission cable accommodating unit; 93, a central hole; 94, an upper guide; 95, a lower guide; 96, a drawing roller; 97, a roller drive force transmitting section; 98, a withdrawing angle adjusting device; 99, a gear 100, a drive motor; 101, a motor casing; 102, a cable taking device; and 103, a guide cap.

As shown in FIG. 20, the transmission cable accommodating unit 92 is cylindrical and has the aforementioned central hole 93 at its center. The central hole 93 is cylindrical and extends through the bottom of the transmission cable accommodating unit 92. Therefore, the transmission cable accommodating unit 92 has a transmission cable accommodating chamber, at the bottom, which is annular.

FIG. 18 shows the cable taking device 102 set on the transmission cable accommodating unit 92, the lower guide 95 set on the cable taking device 102, and the upper guide 94 set on the lower guide 95. The motor casing 101 is located at the center of the lower portion of the cable taking device 102 in such a manner that it is in the central hole 93 of the transmission cable accommodating unit 92. The drive motor 100 is provided in the motor casing 101, and the rotation of the drive motor 100 is transmitted through the gear 99 and the roller driving force transmitting section 97 to the drawing roller 96. The drawing roller 96 is rotated, drawing the transmission cable 91 down the upper guide 94 and along the locus 104 thereof. The gear 99 also applies torque to the drawing angle adjusting device 98, thus changing the angle of the drawing roller 96. Therefore, while the transmission cable 91 is drawn, position of locus 104 of the transmission cable 91 is shifted slightly.

FIG. 19 shows a part of the transmission cable 91 which has been accommodated in the transmission cable accommodating unit 92. As shown in FIG. 19, the transmission cable 91 is accommodated by being shifted in position. Once the transmission cable 91 has been accommodated in the transmission cable accommodating unit 92, the transmission cable accommodating unit 92 is disengaged from the cable taking device 102.

When installing the transmission cable, as shown in FIG. 20, the guide cap 103 is set on the transmission cable accommodating unit 92, and the transmission cable 91 is withdrawn through the hole in the guide cap 103.

To aid in understanding the withdrawal process, FIG. 20 illustrates the guide cap 103 removed obliquely above the transmission cable accommodating unit 102.

The above-described conventional technique is disadvantageous in the following ways:

(1) The transmission cable accommodating unit is bulky due to the drive motor being positioned at its center.

(2) The drawing roller's intricate motion requires a large number of components, and accordingly is high in manufacturing cost.

(3) For the same reason in (2), it is difficult to adjust the drawing roller.

(4) Since the transmission cable is dropped or drawn into the transmission cable accommodating unit by its own weight, it is necessary to provide a transmission cable accommodating unit with a considerably large floor area.

(5) Since the transmission cable is withdrawn from the transmission cable accommodating unit using the cap guide set on it as shown in FIG. 20, the cable drawing tension is unstable.

The noted disadvantages of the prior art transmission cable accommodating technique require the process of accommodating the transmission cable within the transmission cable accommodating unit to be performed at the factory. Therefore the prior art technique is not suitable for dealing with the extra length of transmission cable encountered during transmission cable installation.

Additionally, it is desirable to form a high tensile strength transmission wire. A method in the art achieves this by winding a transmission cable around a strength wire. However, such transmission cables are large in sectional area and low in flexibility. Therefore, any technique for providing for the extra length of transmission cable, especially those transmission cables having connectors, must accommodate for the extra space requirement of large cross section, low flexibility transmission cables.

During the installation of a transmission cable, it sometimes becomes necessary to draw out or draw in the transmission cable while the transmission cable is connected to a communications network; for instance, when moving the transmission cable transmission box or when constructing a building. This requirement occurs most frequently with a so-called "drop transmission cable" which is laid between a subscriber and a branching point on a communication pole. In order to meet this requirement, the extra length of transmission cable which can be wound or unwound should be at least 10 m. The transmission cable termination box for dealing with this extra length remains connected to the communication line. Therefore, in order to allow for wide use of a transmission cable termination box, it is essential that it be small in size and low in manufacturing cost.

SUMMARY OF THE INVENTION

Objectives of the present invention are to provide a transmission cable termination box which may be of a vertical type, is compact, and allows a transmission cable to be smoothly drawn in and out thereof. A further objective is to provide a transmission cable installation and recovery method utilizing the transmission cable termination box.

The objectives of the present invention are achieved by providing a transmission cable termination apparatus for winding and unwinding transmission cable therefrom. The termination apparatus includes a stationary winding barrel having a central axis, and a transmission cable guide rotatably coupled to the stationary winding barrel for guiding a transmission cable onto and from the stationary winding barrel by being rotated around the central axis. The transmission cable guide prevents portions of the transmission cable outside the stationary winding barrel from being twisted.

The termination apparatus may additionally include a rotary board at a first end of the stationary winding barrel which is rotatably driven by a rotary shaft passing through the central axis of the winding barrel. Furthermore, in this embodiment of the termination apparatus, the transmission cable guide is a hole in the rotary board through which a transmission cable is passed; and a drawing means is used to draw a transmission cable passing through the transmission cable guide into and out of the termination apparatus in response to rotation of the rotary board.

A handle or other alternative drive means can be used to rotatably drive the rotary shaft. The drawing means has a gear system which transfers to rollers the torque produced when the rotary board rotates. The rollers draw the transmission cable in and out of the termination apparatus.

In another embodiment, the transmission cable guide is supported on an arm which is rotatably connected and detachable from the winding barrel. The arm may be rotatably driven by a driving means via an adjustable length drive shaft. The transmission cable guide is a tubular element having a bent tip for directing the transmission cable towards the winding barrel. The tubular transmission cable guide can be formed of two halves which are fastened and unfastened by a fastening means to enclose and release a transmission cable.

Additionally, the termination apparatus can include a roller means for depressing the transmission cable on the stationary winding barrel to provide for uniform winding and prevent the loosening of the transmission cable. The termination apparatus may also include a reciprocating means for causing the transmission cable guide to guide the transmission cable transversely along the central axis of the stationary winding barrel.

The objectives of the present invention are also obtained by providing methods for winding and unwinding the transmission cable from the termination apparatus. In a method for winding the transmission cable, an end of a transmission cable is passed through a transmission cable guide into a termination apparatus, and secured to prevent an unintentional withdrawal of the transmission cable from the termination apparatus. Then the transmission cable guide is rotated around a central axis of a stationary winding barrel of the termination apparatus to wind the transmission cable on the stationary winding barrel. The transmission cable guide may be rotated manually. For instance, a handle detachably connected to a rotary shaft of a rotary board may be turned by hand. The winding method can also include the additional step of reciprocating the transmission cable guide as it is rotated to wind the transmission cable transversely along the stationary winding barrel. In the unwinding method, an end of the transmission cable stored on a winding barrel of a termination apparatus is passed outside of the termination apparatus via a transmission cable guide, and then pulled to unwind the transmission cable. The method of unwinding a transmission cable can be modified to include the use of a strength wire. When using a strength wire, the end of the transmission cable passed outside of the termination apparatus is attached to an end of a strength wire which has been passed through the termination apparatus via a strength wire supplying hole along a central axis of the stationary winding barrel. The end of the strength wire is then pulled to unwind the transmission cable from the stationary winding barrel and wind the transmission cable on the strength wire.

The objectives of the present invention are further achieved by providing a method for installing a transmission cable; wherein the transmission cable is stored on a stationary winding barrel of a termination apparatus. In a first step of the method, a first end of a transmission cable is passed outside the termination apparatus via a transmission cable guide, and connected to a transmission supply point. Then an end of a strength wire, supplied by a strength wire barrel positioned behind the termination apparatus, is passed through the termination apparatus via a strength wire supplying hole along a central axis of the stationary winding barrel. The end of the strength wire is retained at the transmission supply point. The termination apparatus and strength wire barrel are then moved to a transmission receiving point. The strength wire is cut at a point before the strength wire enters the termination apparatus, and the strength wire barrel is removed. Next the strength wire is retained at the transmission receiving point, and a second end of the transmission cable is connected to the transmission receiving point.

The installation method can be modified to install more than one cable using the same strength wire. Additionally, several transmission cables connected to the same transmission supply point can be installed to different transmission receiving points. Each transmission cable is supplied by an associated termination apparatus. The termination apparatuses are arranged in series to align a central axis of a winding barrel of each termination apparatus with one another. Then, as described above, the transmission cables are connected to a transmission supply point, and a strength wire, passing through all the termination apparatuses, is retained at the transmission supply point. The termination apparatuses and the strength wire barrel are moved near a first receiving point. At the first receiving point, the first termination apparatus (i.e., the first transmission cable) is branched from the other termination apparatuses. The branching is performed by cutting the strength wire at a point where the strength wire exits the strength wire supplying hole of the first termination apparatus. The strength wire is then removed from the first termination apparatus. An end of a second strength wire, supplied by a second strength wire barrel positioned behind the first termination apparatus, is passed through the strength wire hole of the first termination apparatus. The cut ends of the first strength wire are reconnected, and the end of the second strength wire is connected to the reconnected cut ends. Then as described above with respect to the method of installing a single transmission cable, the first transmission cable from the first termination apparatus is connected to the first transmission receiving point. Each successive termination apparatus is then branched at each successive transmission receiving point and connected thereto.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

Figure 1:
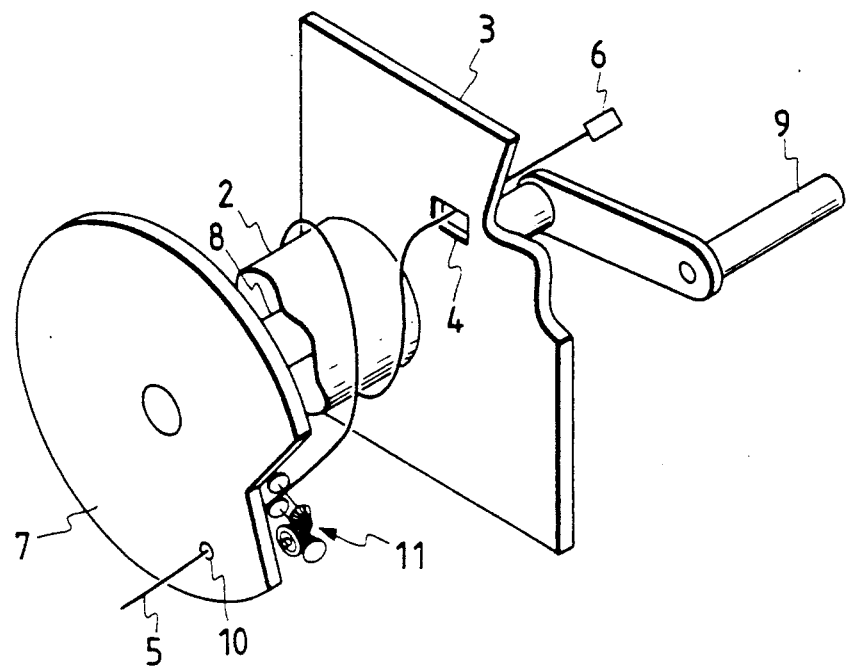
FIG. 1 is a perspective view, with parts cut away, of an example of a transmission cable termination box, which constitutes a first embodiment of the present invention.
Figure 2:
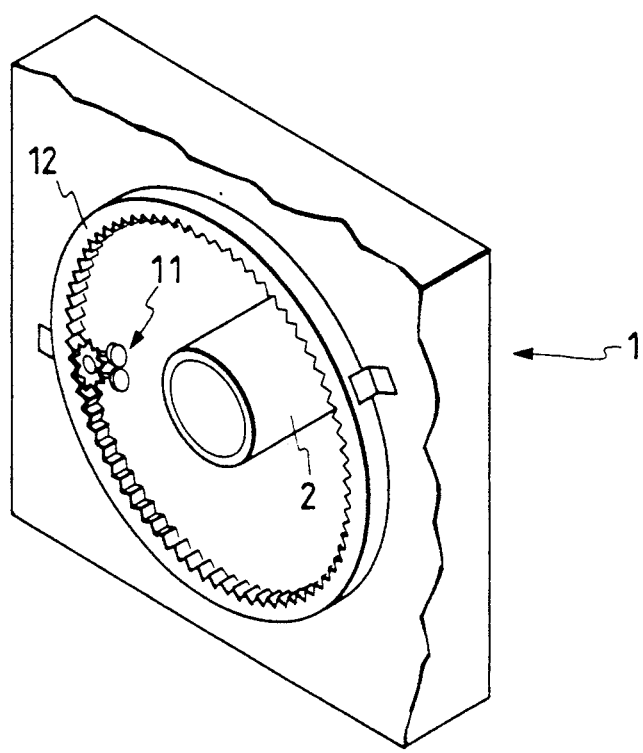
FIG. 2 is a diagram illustrating a drive mechanism in the transmission cable termination box shown in FIG. 1.
Figure 3:
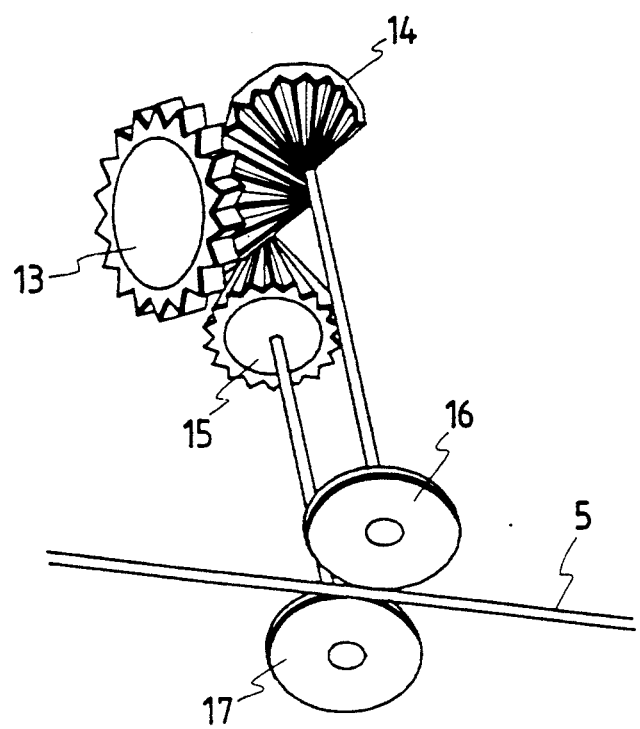
FIG. 3 is an enlarged diagram of a drive section of the drive mechanism shown in FIG. 2.
Figure 4:
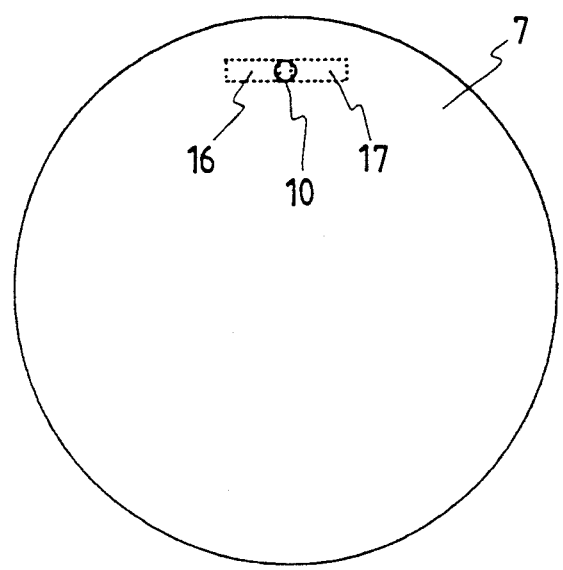
FIG. 4 is a front view of a rotary board shown in FIG. 1.

DETAILED DESCRIPTION OF THE PREFERRED EMBODIMENTS,

FIGS. 1-4 are diagrams for describing a transmission cable termination box, hereinafter termination box, which constitutes a first embodiment of this invention. More specifically, FIG. 1 is a perspective view, with parts cut away, showing the termination box as viewed obliquely from the front. FIG. 2 is an explanatory diagram for describing a drive mechanism of the termination box. FIG. 3 is an enlarged diagram showing a drive section of the drive mechanism, and FIG. 4 is a front view of a rotary board of the termination box. In FIGS. 1-4, reference numeral 1 designates a transmission cable termination box body; 2, a winding barrel; 3, a side board; 4, a lower end hole for a transmission cable; 5, a transmission cable; 6, a lower end connector; 7, a rotary board; 8, the rotary shaft of the rotary board 7; 9, a handle; 10, a transmission cable guide; 11, a drive section; 12, a circular rail with teeth (hereinafter referred to as "internal gear 12", when applicable); 13, a planet gear; 14 and 15, bevel gears; and 16 and 17, drawing rollers.

The winding barrel 2 has a horizontal axis with one end portion thereof secured to a first of two side surfaces of the side board 3. A lower end of the transmission cable 5, wound on the winding barrel 2, is passed through the lower end hole 4 of the side board 3 and connected to the lower end connector 6. The rotary board 7 is provided at the end of the winding barrel 2 opposite side board 3. The rotary shaft 8 of the rotary board 7 is extended through the inside of the winding barrel 2, and detachably connected to the handle 9 on the second side of the side board 3. Thus, the rotary board 7 is rotated with respect to the winding barrel 2. FIG. 4 shows that in this embodiment the transmission cable guide 10 is an opening in the rotary board 7. The transmission cable 5 wound on the winding barrel 2 is drawn in and out through the transmission cable guide 10.

The drive section 11 is provided to make the speed of movement of the transmission cable 5 proportional to the speed of rotation of the rotary board 7. In the above-described termination box, the drive force of the drive section 11 is transmitted as follows: As shown in FIG. 2, the planet gear 13 of the drive section 11 is engaged with the stationary internal gear 12 provided in the termination box body 1. The rotary shaft of the planet gear 13 is rotatably supported on the inside of the rotary board 7. Hence, as the rotary board 7 rotates, the planet gear 13 is rotated, and of the drive section 11 draws the transmission cable 5 in or out of the termination box. The rotary board 7 is turned manually using the handle 9.

The planet gear 13 is made up of a spur gear 13a and a bevel gear 13b. The spur gear 13a is engaged with the above described internal gear 12, and the bevel gear 13b transmits the torque received by spur gear 13a to two bevel gears 14 and 15. The two bevel gears 14 and 15 are engaged with the planet gear 13 so that they turn in opposite directions. The bevel gears 14 and 15 are connected to drawing rollers 16 and 17, respectively. As the bevel gears 14 and 15 turn, the transmission cable 5 is drawn in or out through the transmission cable guide 10. The surfaces of the drawing rollers 16 and 17, as shown in FIG. 3, are perpendicular to the opening which is the transmission cable guide 10.

The transmission cable 5 is drawn in as follows: As the handle 9 connected axially to the rotary board 7 is turned, the rotary board 7 is rotated, and accordingly the transmission cable guide 10 is also turned. Simultaneously, the planet gear 13 on the rotary board 7 is rotated in connection with the internal gear 12. The torque of the planet gear 13 is transmitted through the bevel gears 14 and 15 to the drawing rollers 16 and 17. Proportional to their angle of rotation, rotating drawing rollers 16 and 17 drawn in a length of the transmission cable 5. The transmission cable 5 is drawn in a predetermined length per revolution of the rotary board 7; and therefore, when the transmission cable 5 is drawn in, it is wound on the winding barrel 2 without being caught. Every revolution of the rotary board 7 twists the transmission cable 5. To prevent this twisting from being transmitted to a portion of the transmission cable 5 located outside of the termination box, the transmission cable 5 should be wound on the winding barrel 2 while being depressed near the termination box. When this is done, the transmission cable is twisted inside the transmission cable termination box, but not outside it.

The transmission cable 5 is drawn out as follows: When the drawing rollers 16 and 17 are turned by drawing out the transmission cable 5, the drive section 11 operationally connected thereto is rotated in a direction opposite that of the drawing in process. By providing a braking mechanism on the drive section 11, it is possible to adjust to a suitable value the tension force of the transmission cable 5. Furthermore, a load can be applied to a rotating shaft, or the rotation thereof can be aided. Additionally, since the transmission cable 5 is twisted inside the transmission cable box, the transmission cable 5 drawn outside the transmission cable box is not twisted.

In a termination box constructed as described above, the drive mechanism 11, when compared with a conventional one, is considerably simple in construction, low in manufacturing cost, and can be adjusted with ease. Furthermore, it is unnecessary for the termination box to have a large electric motor near its central axis; and therefore, the termination box can be miniaturized. In drawing out the transmission cable, tension can be adjusted with ease, and more specifically the tension can be adjusted in compliance with a given span of an installation or other installation conditions. In addition, the termination box can be of a vertical type (i.e, operated such that the central axis of the winding barrel 2 is horizontal), and the installation floor area can be reduced.

A stationary side board smaller in diameter than the transmission cable guide 10 may be provided inside the rotary board 7 and secured to the winding barrel 2. The stationary side board prevents the transmission cable 5 drawn in from being rubbed by the rotary board 7. It is not always necessary to use the rotary board 7, a rotary arm with a transmission cable guide may be employed.

It is preferable to provide a rotary board fixing mechanism to prevent the rotary board 7 from being unintentionally turned for some reason when the termination box is not in use. The transmission cable guide 10 may be a rubber member having a hole, the diameter of which is substantially equal to the outside diameter of the transmission cable 5. The rubber member serves as a frictional means for preventing the unintentional movement of the transmission cable 5.

In the above-described transmission cable termination box, the rotary board 7 is turned with the handle 9 connected directly to the shaft of the rotary board 7; however, the invention is not limited to this embodiment. For instance, a gear system may be provided on the side of the rotary board 7 to turn the rotary board 7. Since the handle 9 is detachably coupled to the shaft of the rotary board 7, this allows for a reduction in the termination box size, and can eliminate the unintentional turning of the handle 9.

A prototype of the termination box described above with reference to FIGS. 1-4 is described below. In the termination box, the winding barrel 2 was 80 mm in diameter and 80 mm in length, the rotary board 7 was 200 mm in outside diameter, and the diameters of the drawing rollers 16 and 17 were determined to provide a cable drawing speed of 46 cm/sec.

The transmission cable 5 used was optical fiber, 50 m in length and 2 mm in diameter, the lower end of which was protruded through the lower end hole 4. The handle 9 was then turned to draw the transmission cable 5 into the termination box. By turning the handle 9, the transmission cable 5 could be drawn, in its entirety, into the termination box in two minutes. Once in the termination box, the upper end of the transmission cable 5 was pulled to draw the transmission cable 5 out of the termination box. The transmission cable 5 was smoothly drawn out of the termination box in a little more than one minute without being entangled.

The diameter of the winding barrel 2, and the length of the transmission cable 5 drawn per revolution of the rotary board 7 were changed, i.e. the degree of freedom of the transmission cable 5 drawn into the termination box was changed. A determination was made as to whether the transmission cable 5 wound on the winding barrel 2 loosened. The evaluation determined that the transmission cable 5 loosened in inverse proportion to the diameter of the winding barrel 2, and in direct proportion to the length of the transmission cables 5 drawn per revolution of the rotary board 7. In the case where the diameter of the winding barrel 2 was large, the length of the transmission cable 5 which could be wound was limited.

Figure 21:
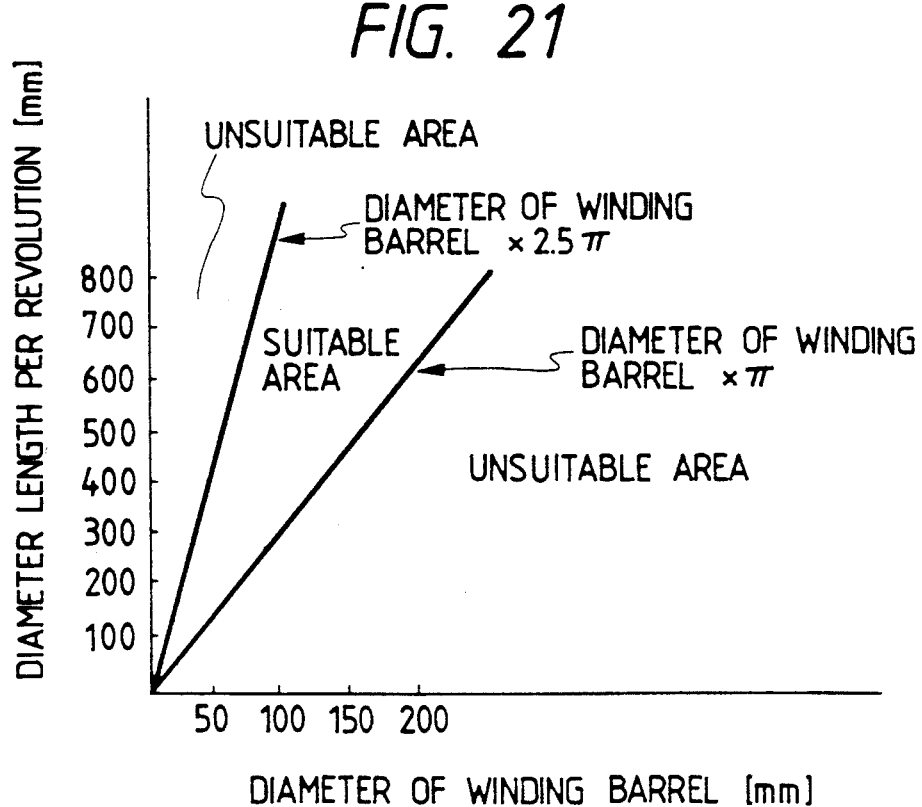
FIG. 21 is a graphical representation for describing a method of determining the diameter for a winding barrel.

The transmission cables employed were those which were covered with polyethylene, polyvinyl-chloride, etc. The evaluation results show that in a termination box of the present invention, when the length of the transmission cable 5 to be drawn per revolution of the rotary board 7 was less than $2.5\pi$ times the diameter of the winding barrel 2, the transmission cable 5 was not loosened, see FIG. 21. Therefore, the termination box of the present invention operated satisfactorily.

The reason for the above relationship is as follows: When the transmission cable is wound on the winding barrel while being drawn into the termination box at a certain constant speed, the turns of the transmission cable thus wound are slightly different in winding configuration from one another. In other words the windings of the transmission cable slightly overlap one another. This slight overlap prevents the transmission cable from skidding and becoming loose. Therefore, when the degree of freedom of the transmission cable is larger than a certain value, the transmission cable is frequently caused to skid and becomes loose.

Furthermore, the length of the transmission cable to be drawn into and out of the termination box per revolution of the rotary board can be adjusted by changing the diameter of the drawing rollers or the gear ratio of the drive section.

Figure 5:
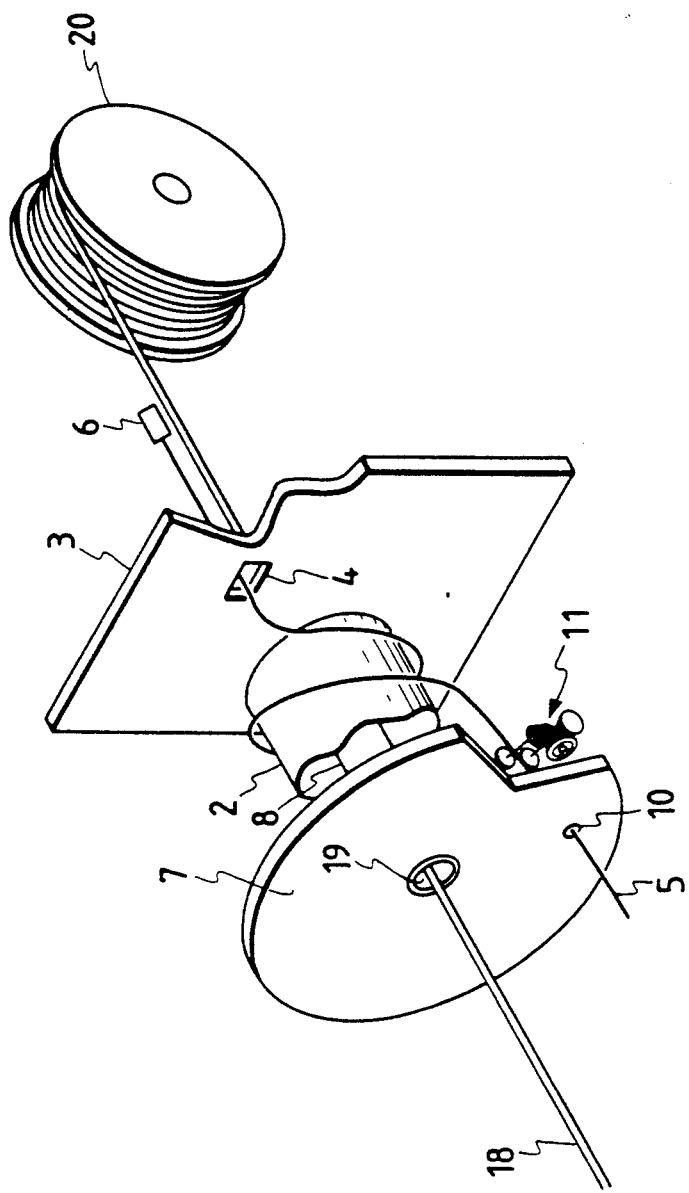
FIG. 5 is a perspective view, with parts cut away, another example of the transmission cable termination box, which constitutes a second embodiment of the present invention.

FIG. 5 is a perspective view, viewed obliquely from the front, with parts cut away, of a termination box according to a second embodiment of the present invention. In FIG. 5, parts functionally corresponding to those described with reference to FIG. 1 are designated by the same reference numerals; and therefore, are not described in this embodiment. Further, in FIG. 5, reference numeral 18 designates a strength wire; 19, a strength wire supplying hole; and 20, a strength wire supplying barrel. With the termination box shown in FIG. 5, the transmission cable 5 can be installed while being wound around the strength wire 18, and a transmission cable 5 wound around a strength wire 18 can be recovered (drawn in).

The strength wire supplying hole 19 extends through the rotary shaft 8 of the rotary board 7 and an opening in the side board 3. As in the first embodiment, described with reference to FIG. 1, the rotary board 7 is turned with a suitable drive mechanism (not shown); such as a gear mechanism with a handle. The strength wire 18 is pulled from the strength wire supplying barrel 20 through the strength wire supplying hole 19 during installation; and during recovery, the strength wire is recovered (wound) on the strength wire supplying barrel 20 upon being drawn into the termination box through the strength wire supplying hole 19. An interlocking mechanism (not shown) may be provided to insure that the transmission cable 5 moves into or out of the termination box at a constant rate of speed with respect to the speed with which the strength wire 18 is drawn into or out of the termination box. The interlocking mechanism comprises a gear system or the like which causes men, pets interlocking with the movement of the strength wire 18 to interlock with the rotary board 7 etc. The termination box may also be so designed that the interlocking mechanism can be removed, and the operation of the handle, only, supplies the transmission cable 5.

When the transmission cable 5 is drawn out of the termination box, the strength wire 18 is drawn out through the strength wire supplying hole 19, at a constant speed. The rotary board 7 supplies the transmission cable 5 which is wound on the strength wire 18. After the transmission cable 5 has been drawn out a predetermined length from the termination box, the strength wire 18 may be placed behind the termination box or cut and retained by a conventional method. The strength wire 18, unlike the transmission cable 5, can be readily connected or retained by conventional methods such as caulking or bonding. When it is unnecessary to use the strength wire 18, the strength wire 18 is cut so that only the transmission cable 5 is supplied.

When the transmission cable 5 is drawn into the termination box, the strength wire 18 is also drawn into it through the strength wire supplying hole 19. In association with this operation, the rotary board 7 recovers a predetermined length of the transmission cable 5 which is unwound from the strength wire 18. The transmission cable 5 thus drawn in is accommodated in the termination box. The strength wire 18 thus drawn is allowed to go through the termination box. Therefore, the strength wire 18 may be removed by cutting, retained after cutting, or stored behind the termination box on the strength wire supplying barrel 20.

If the transmission cable 5 is cut, then it is rather difficult to use again. This problem is overcome by the termination box of the present invention which allows cutting of the strength wire 18 without cutting the transmission cable 5. The termination box of the present invention offers the advantages of a transmission cable 5 which is stored compact or small in sectional area and used as a high tension resistant cable with a strength wire.

In the installation of the transmission cable, such as from indoors to outdoors or where parts of the strength wire can be omitted, the termination box of the present invention provides the advantage that the transmission cable can be installed in one piece and includes parts different in structure (i.e. with and without strength wire).

When installing the transmission cable 5, the strength wire 18 and the transmission cable 5 may be shifted from each other when drawn out of the termination box. This difficulty may be prevented by locally securing the transmission cable 5 and the strength wire 18 to each other, for instance, with a bonding agent or locking belts.

The length of the transmission cable 5 drawn into or out of the termination box per revolution of the rotary board 7 can be adjusting by changing the diameter of the drawing rollers 16 and 17 or the gear ratio of the drive section 11. By adjusting the length of the transmission cable 5 drawn into or out of the termination box with respect to the length of the strength wire 18 drawn into or out of the termination box, the pitch of the o winding of the transmission cable 5 on the strength wire 18 can be adjusted.

In the above-described termination box, the speed of rotation of the rotary board 7; (i.e., the speed of movement of the transmission cable 5) and the speed of movement of the strength wire 18 are related to each by a certain ratio. However, it is not always necessary to relate the former to the latter. That is, in practice, if the transmission cable 5 is installed without being loosened from the strength wire 18 to a great degree, then no difficulties, such as with mechanical strength or transmission characteristics of the transmission cable 5, will be encountered.

A prototype of the transmission cable termination box described above with reference to FIG. 5 is described below. In the prototype, the winding barrel 2 was 80 mm in diameter and 80 mm in length, and the rotary board 7 was 200 mm in outside diameter. The transmission cable 5, employed was an optical fiber single core cord covered with polyvinyl-chloride, 3 mm in outside diameter. The drive section 11 designed drew the optical fiber single core cord into and out of the termination box at 36 cm per revolution of the rotary board 7. With the end portion of the transmission cable 5 protruding through the lower end hole 4, the rotary board 7 was turned with a handle to draw the transmission cable 5 of length 50 m into the termination box in one minute and forty seconds.

The strength wire 18 employed was a wire 1.2 mm in diameter formed by coating a zinc-plated stranded steel wire with polyvinyl-chloride. A gear system was so designed that the strength wire was moved 35 cm per revolution of the rotary board 7.

Next, a gear mechanism was formed to turn the rotary board 7 by the movement of the strength wire 18. The strength wire 18 of 40 m was pulled out of the transmission cable termination box through the strength wire supplying hole 19 at a rate of 20 m/min.

Thus, upon drawing the strength wire 18, the rotary board 7 was turned, and the transmission cable 5 wound on the strength wire 18 at 35 cm per revolution of the rotary board 7.

Thereafter, in order to practice the transmission cable 5 recovery method, the strength wire 18 was cut at the rear of the termination box, and then 20 m of strength wire 18 was drawn in at speeds ranging from 5 m/min to 30 m/min. During this operation, the rotary board 7 turned in correspondence with the speed of the strength wire 18 so that the transmission cable 5 was recovered smoothly into the termination box.

Figure 6A:
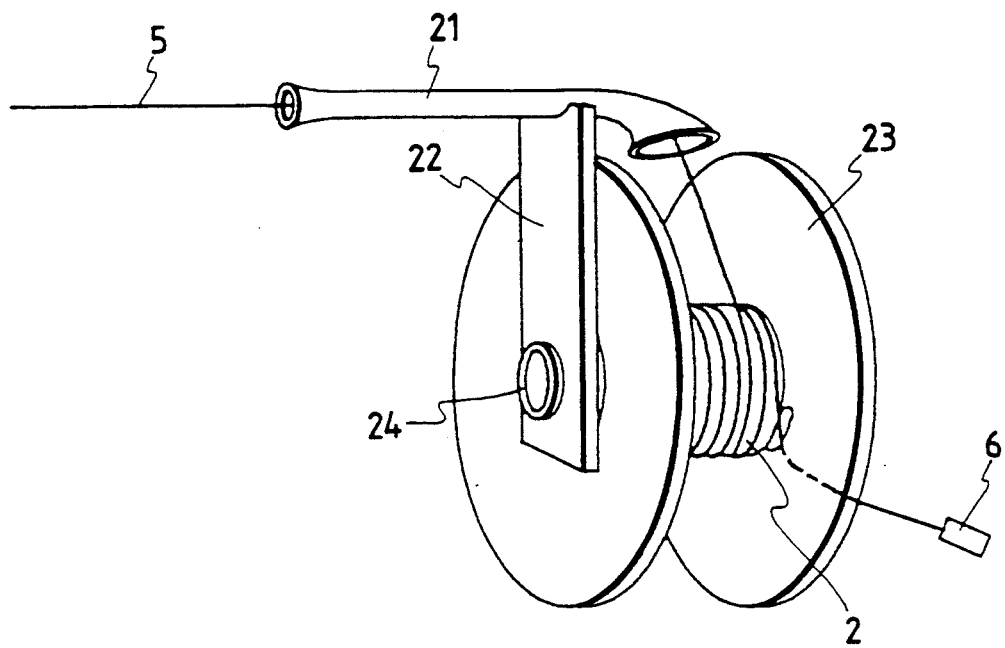
FIGS. 6(A) and 6(B) are explanatory diagrams outlining the arrangement of a third embodiment of the present invention.
Figure 6B:
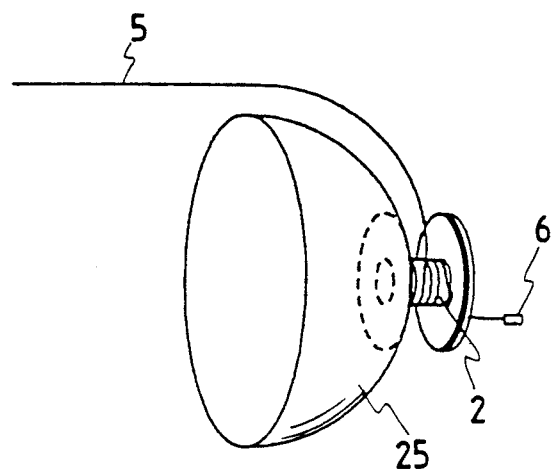

FIGS. 6(A) and 6(B) are an explanatory diagrams outlining the arrangement of a termination box, which constitutes a third embodiment of the present invention. In the termination box shown in FIGS. 6(A) and 6(B), the transmission cable guide is simplified. In FIGS. 6(A) and 6(B) like reference numerals designate like elements described in the previous embodiments. In FIGS. 6(A) and 6(B) reference numeral 21 designates a transmission cable guide cylinder; 22, a supporting arch; 23, barrel flanges; 24, a central shaft; and 25, a curved surface guide. FIG. 6(A) shows the transmission cable 5 being wound on the winding barrel 2. The transmission cable guide cylinder 21 corresponds to the opening which was the transmission cable guide 10 described in FIG. 1. In the termination box shown in FIG. 6(A), the transmission cable guide cylinder 21 comprises: a cylindrical portion for receiving the transmission cable 5, and a bent portion for guiding the transmission cable 5 towards the winding barrel 2. The winding barrel 2 has the barrel flanges 23 to prevent the wound transmission cable 5 from collapsing. The transmission cable guide cylinder 21 is supported by the supporting arm 22 on the central shaft 24. Central shaft 24 is the central axis of rotation. Operation of the termination box to wind the transmission cable 5 on the winding barrel 2 is as follows: The portion of transmission cable 5 outside the termination box and near the transmission cable guide cylinder 21 is held so that it does not twist. Under this condition, the transmission cable guide cylinder 21 is rotated around the central shaft 24; i.e., around the winding barrel 2 together with the supporting arm 22 so as to wind the transmission cable 5 is wound on the winding barrel 2.

It is preferable that the transmission cable guide cylinder 21 be dividable into two halves along its longitudinal axis in order to remove the transmission cable guide cylinder 21 from the termination box when it is not in use. Thus, the transmission cable guide cylinder 21 can be formed by combining the two halves together with belts or the like. With the transmission cable guide cylinder 21 thus designed, parts such as the supporting arm 22 and the guide cylinder 21 can also be removed. After the transmission cable 5 has been installed or recovered, these parts are no longer necessary to hold the transmission cable 5. Hence, the termination box is simple in structure when not in use; that is, when the transmission cable 5 is not being wound on or unwound from the winding barrel 2.

The transmission cable 5 wound on the winding barrel 2 can be drawn out as follows: The transmission cable 5 is drawn out by turning the transmission cable guide cylinder 21 in the direction opposite to the direction in which the guide cylinder 21 was turned to wind the transmission cable 5 on the winding barrel 2.

In addition, the transmission cable 5 can be pulled out according to the following method shown in FIG. 6(B): A semi-spherical curved surface guide 25 is detachably connected to the winding barrel 2 from which the supporting am 22 and the transmission cable guide cylinder 21 have been removed. In this situation, the transmission cable 5 is pulled out sliding on the curved surface guide 25 while changing its drawing direction around the winding barrel 2.

Furthermore, the termination box of FIGS. 6(A) and 6(B) can be used in conjunction with a strength wire (not shown) which is passed through central shaft 24. The strength wire being stored on a strength wire supplying barrel (not shown) which is positioned behind the termination box.

A method of using the termination box is as follows: At the factory, a predetermined length of the transmission cable 5, with the lower end portion pulled out through the lower end hole 4 and connected to lower end connector 6, is wound on winding barrel 2. Under this condition, the termination box is shipped to a work site. At the work site, the lower end connector 6 of the transmission cable 5 is connected to a predetermined connecting terminal, and the transmission cable 5 is drawn out of the termination box to connect the other end connector (i.e. upper end connector) to a desired transmission cable.

Thus, in an emergency with the installation length unknown or when installing a transmission cable for a subscriber, the termination box of the present invention can be used to install the transmission cable.

FIGS. 7-12 are explanatory diagrams describing a method of installing a transmission cable using the embodiment of the termination box shown in FIGS. 6(A) and 6(B) in conjunction with a strength wire. More specifically, FIGS. 7-12 are diagrams showing a step by step method of dropping three transmission cables 5 to three subscribers from a distributor 40 on a pole. In FIGS. 7-12, reference numeral 5 designates transmission cables; 31, 32 and 33, strength wires; 34, a retainer; 35, 36 and 37, the transmission cable termination boxes; 38, a cutting point; 39, a strength wire T type branching part; 40, a distributor; 41, 42 and 43, strength wire barrels; 44, transmission cable connectors such as an optical cable connector; 45, a first subscriber; and 46, a connecting point. The transmission cable 5 is an optical fiber single core cord 3 mm in diameter described in the first and second embodiments.

Figure 7:
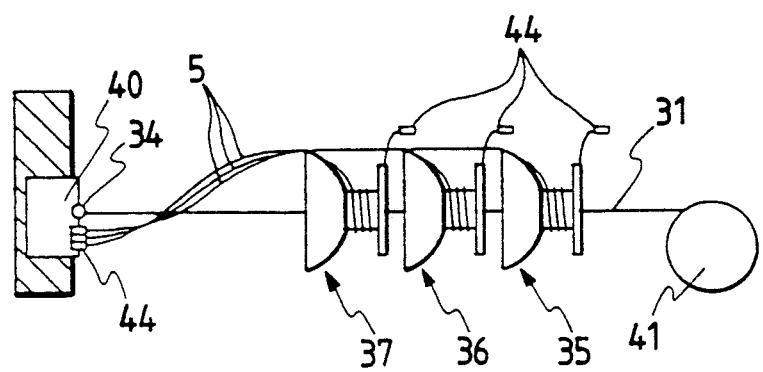
FIG. 7 is an explanatory diagram showing the step of connecting transmission cables and a strength wire in an example of a transmission cable installing method according to the present invention.

FIG. 7 is an explanatory diagram showing the connection of three transmission cables to a distributor 40. The strength wire 31, drawn out of the strength wire barrel 41, is passed through the central axis of the termination boxes 35, 36 and 37, and connected to the retainer 34 on the distributor 40. The transmission cables 5 are connected to the transmission cable connector 44 on the distributor 40.

Figure 8:
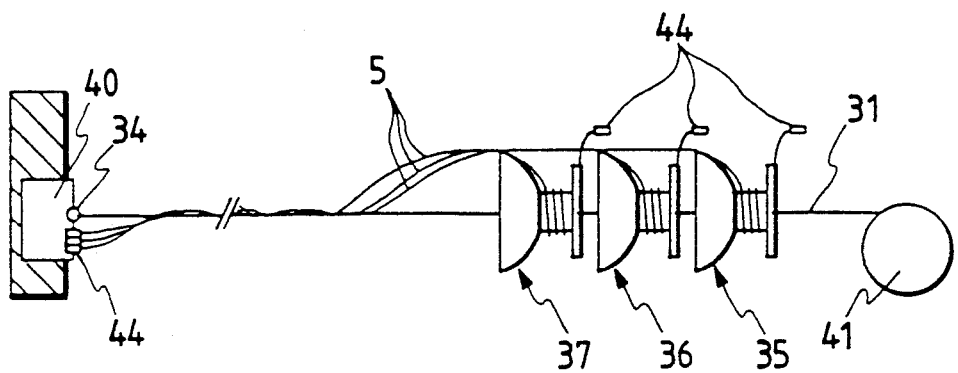
FIG. 8 is an explanatory diagram showing the step of drawing transmission cables and strength wires out of the windings barrels in the transmission cable installing method of the present invention.

FIG. 8 shows the step of drawing the strength wire 31 and the transmission cables 5 from their respective barrels. While the strength wire 31 is drawn out of the strength wire barrel 41, the termination boxes 35, 36 and 37, without turning around the strength wire 31, let out the transmission cables 5 so that the three transmission cables 5 are wound on the strength wire 31.

Figure 9:
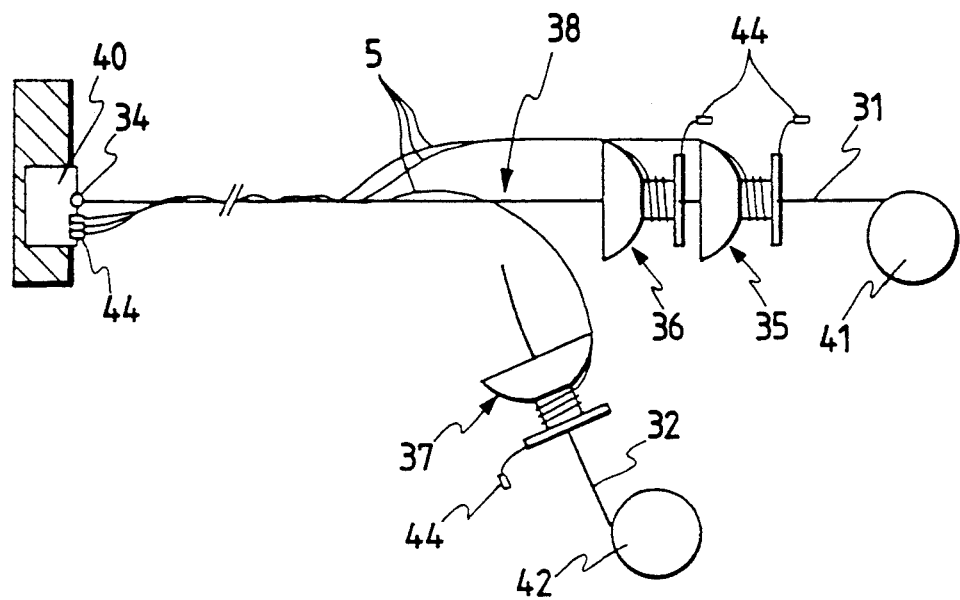
FIG. 9 is an explanatory diagram showing the preparatory step for branching a transmission cable in the transmission cable installing method of the present invention.

FIG. 9 shows the step of preparing for a first branching. At a first subscriber, the strength wire 31 is cut at a cutting point 38, and the termination box 37 is removed from the strength wire 31. Thereafter, another strength wire barrel 42 is obtained so that the transmission cable 5 of the termination box 37 is dropped with the strength wire 32 of the strength wire barrel 42.

Figure 10:
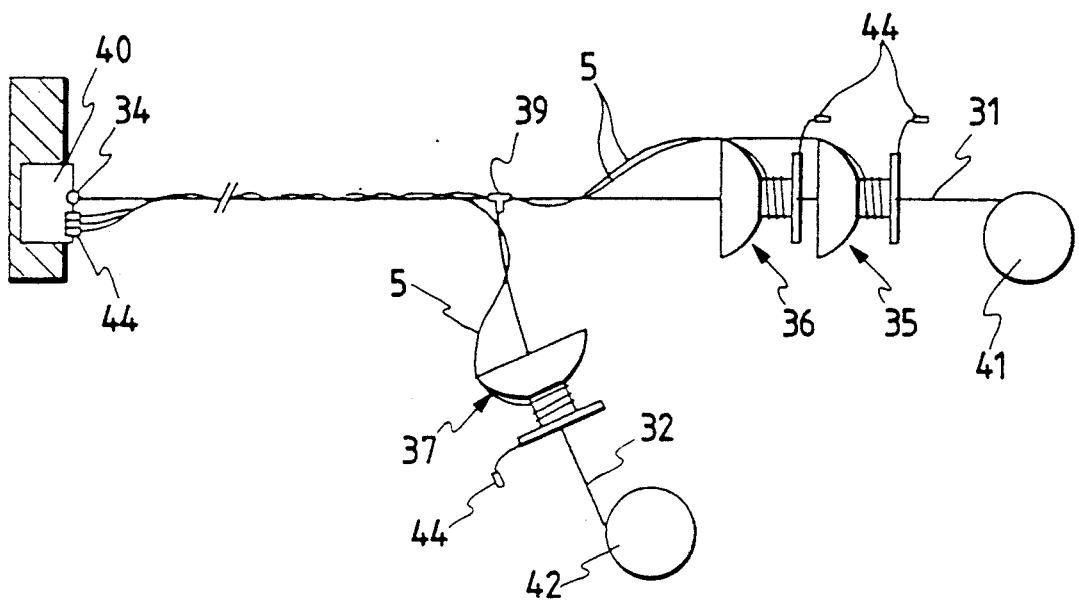
FIG. 10 is an explanatory diagram showing the step of branching a transmission cable in the transmission cable installing method of the present invention.

FIG. 10 shows the first branching step mentioned above. The strength wire 31 cut at the cutting point 38 as shown in FIG. 9 is connected (restored) using the strength wire T type branching part 39 provided at the connecting point (i.e cutting point 38). The T type branching part 39 is connected to the strength wire 32 supplied from the strength wire barrel 42. Thereafter, while the strength wire 32 is being drawn out of the strength wire barrel 42, the transmission cable 5 is wound on it. Thus, the transmission cable 5 of termination box 37 can be installed for the first subscriber. For the remaining subscribers, the remaining termination boxes 35 and 36 together with the strength wire barrel 41 are moved towards those subscribers while the transmission cables 5 are wound on the strength wire 31 as previously described.

Figure 11:
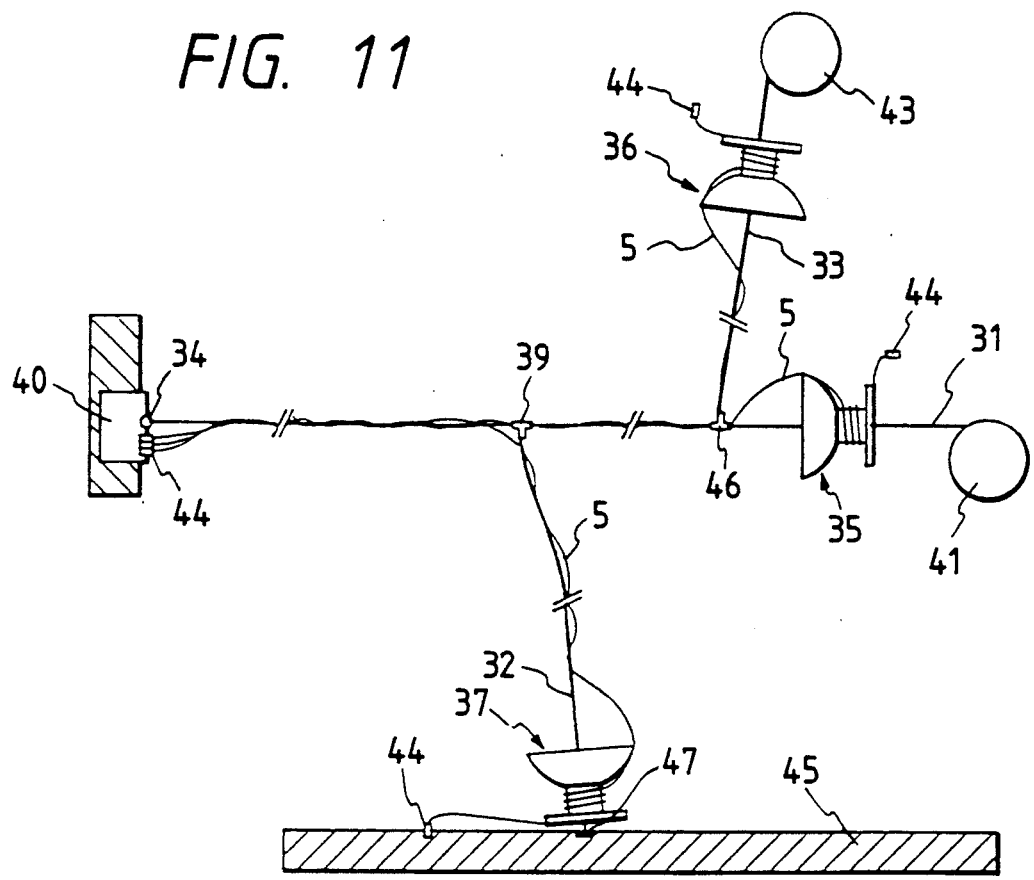
FIG. 11 is an explanatory diagram showing the transmission to cables branched according to the transmission cable installing method of the present invention.

FIG. 11 is a diagram for describing the dropping of the transmission cables 5 for the second and third subscribers. Similar to the dropping of the transmission cable 5 of termination box 37 for the first subscriber 45, the termination box 36 is dropped at the connecting point 46 for a second subscriber and connected to strength wire 33 from strength wire barrel 43. For a third subscriber, the termination box 35 is moved towards the third subscriber, the transmission cable 5 is wound on the strength wire 31 drawing out of the strength wire barrel 41, and the transmission cable 5 then dropped for the third subscriber.

After the transmission cable 5 of the termination box 37 has been dropped, in the above-described manner, at the first subscriber 45, the strength wire barrel 42 is removed by cutting the strength wire 32. The strength wire 32 is then retained by the retainer 47, and the lower end terminal of the transmission cable 5 of termination box 37 is connected to the transmission cable connector 44. Similarly the strength wires 33 and 31 for the second an third subscribers are retained, and the lower end terminals of the transmission cables 5 are connected to connectors 44 of the second and third subscriber respectively. Thus, the transmission cables have been installed.

In the above-described method, one strength wire supports a plurality of transmission cables, and therefore the cables are smaller as a whole than those in the conventional method which use a strength wire for each cable. Furthermore, the transmission cable accommodated as extra length includes no strength wire; and therefore, the volume required for accommodating the extra length of transmission cable is considerably smaller than in the conventional method.

Since a strength wire can be connected with ease, branched at desired points, and transmission cables lain over the strength wires thus branched, the resulting network has a considerably high degree of freedom.

Figure 12:
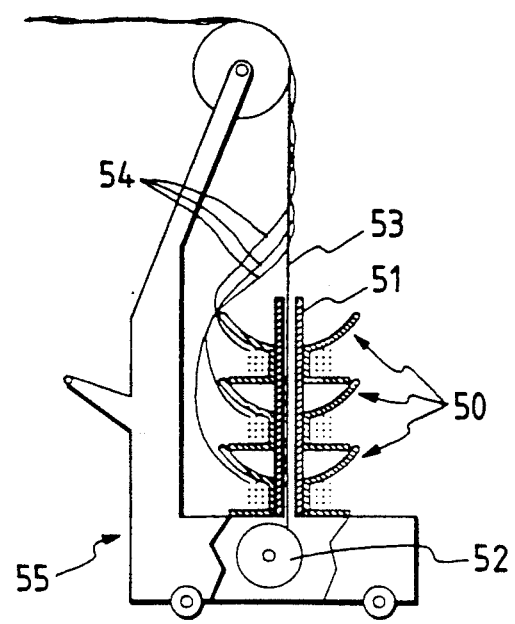
FIG. 12 is an explanatory diagram showing the arrangement of a carriage employed in the transmission cable installing method of the present invention.

FIG. 12 shows the structure of a carriage suitable for the operation which has been described with reference to FIGS. 7-11. In FIG. 12, reference numeral 50 designates termination boxes; 51, a strength wire supplying cylinder; 52, a strength wire barrel; 53, a strength wire; 54, transmission cables; and 55, the carriage. The carriage 55 is so designed that it rotatably supports the strength wire barrel 52 on its lower portion. The strength wire 53 is drawn out of the strength wire barrel 52 through the strength wire supplying cylinder 51. The termination boxes 50 are stacked one on top of the other with the strength wire supplying cylinder 51 held along the central axis thereof. A positioning mechanism (not shown) is provided on the strength wire supplying cylinder 52 to fix the termination boxes, preventing their rotation. With the upper ends of the transmission cables secured to a retaining part (not shown) of the strength wire 53, the carriage 55 is moved so that the strength wire 53 is drawn out while the transmission cables 54 are pulled out of the termination boxes 50. Thus, the transmission cables 54 are laid while being wound on the strength wire 53.

In some installation tasks a strength wire has already been installed. In this situation, installation can be achieved more readily by an aerial laying of transmission cables and strength wire over the strength wire already present. In an aerial installation of transmission cables, the method of the present invention may be effectively employed. According to the present invention, a plurality of transmission cables can be supported by one strength wire by winding the transmission cables on that strength wire. This greatly reduces the weight of the cable line when compared with that in the case where a strength wire is provided for each transmission cable.

When transmission cables are replaced or removed, the function of drawing the transmission cables into or out of a termination box can be effectively utilized.

Figure 13A:
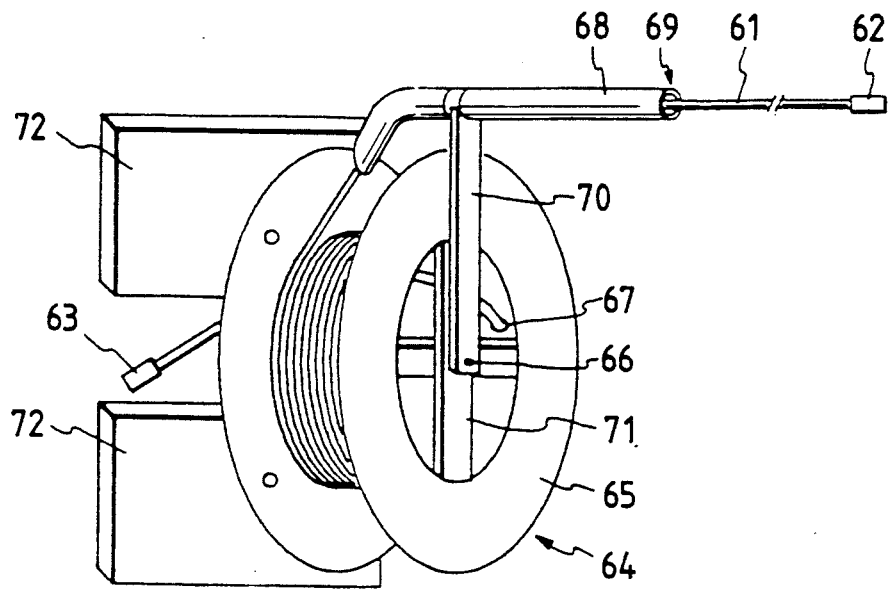
FIGS. 13(A) and 13(B) are explanatory diagrams showing a fourth embodiment of the present invention.
Figure 13B:
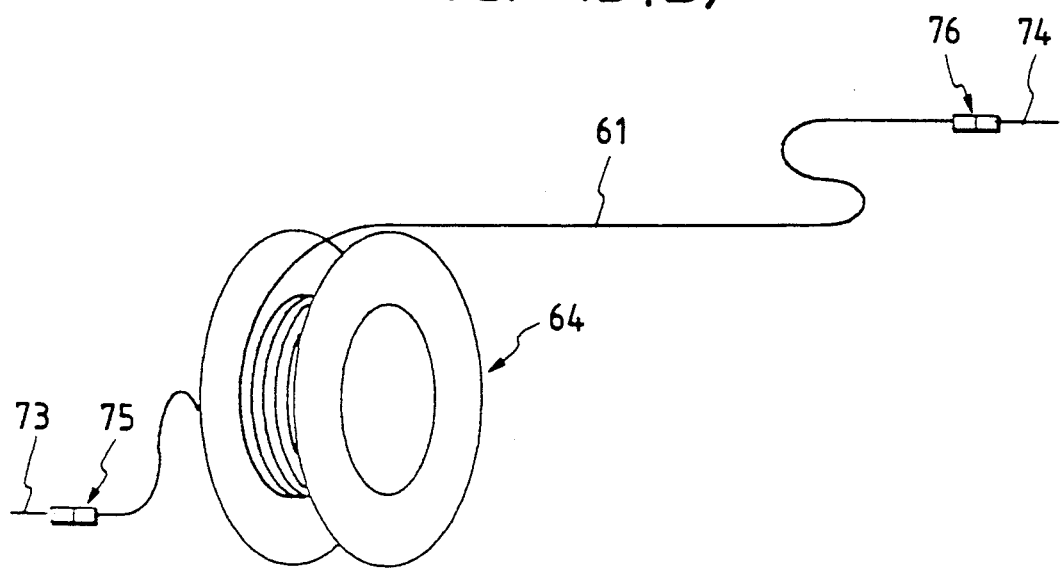

FIGS. 13(A) and 13(B) are explanatory diagrams for describing a termination box which constitutes a fourth embodiment of the present invention, and a method of accommodating a transmission cable in the termination box. More specifically, FIG. 13(A) shows a transmission cable 61 being drawn into the termination box, and FIG. 13(B) shows the transmission cable 61 being drawn out of the termination box. In FIGS. 13(A) and 13(B), reference numeral 61 designates a transmission cable; 62, a transmission cable upper end terminal; 63, a transmission cable lower end terminal; 64, a winding barrel; 65, flanges; 66, the central shaft of the winding barrel 64; 67, a lower end hole; 68, a transmission cable guide; 69, a transmission cable guide inlet; 70, an arm; 71, a transmission cable guide fixing part; and 72, barrel fixing parts.

The lower end terminal 63 of the transmission cable 61 protrudes through the lower end hole 67 formed in the winding barrel 64, and is connected to a related device or another transmission cable. The transmission cable guide 68 is used when the transmission cable is drawn into the termination box. The transmission cable guide 68 is supported by the arm 70 which is turned around the winding barrel's central shaft 66. The arm 70 is rotatably supported by the transmission cable guide fixing part 71 which is detachably coupled to the winding barrel 64. To prevent rotation of the winding barrel 64, the winding barrel 64 is secured to the barrel fixing parts 72.

As the arm 70 is turned, the transmission cable guide 68 is rotated around the winding barrel's central shaft 66 so that the transmission cable 61 is let in through the transmission cable guide inlet 69. The transmission cable 61 thus let in is led between the flanges 65 and circumferentially wound on the winding barrel 64 while changing its direction 90 degrees.

The transmission cable 61 wound on the winding barrel 64 can be readily fixed by putting a fixing member, such as a sponge or the like, between the flanges 65 in contact with the wound transmission cable 61. The fixing member prevents the transmission cable 61 thus wound from becoming loose. It is noted that other methods may be employed for preventing the transmission cable 61 from becoming loose. For instance, cloth tape may be wound on the transmission cable 61 wound on the winding barrel 64, or the upper end portion 62 of the transmission cable can be secured in a suitable position.

To draw the transmission cable 61 out of the termination box, the fixing member is removed, and the transmission cable 61 is pulled out of the termination box. A person standing at a position located in the direction of the axis of the winding barrel 64 and somewhat far from the winding barrel may pull out the transmission cable 61. As shown in FIG. 13(B), the transmission cable 61 is pulled out while being turned around the winding barrel's flange 65. In FIG. 13(B), reference numerals 73 and 74 designate other transmission cables which are connected through connectors 75 and 76 to the upper and lower end terminals 62 and 63 of the transmission cable 61.

Figure 14:
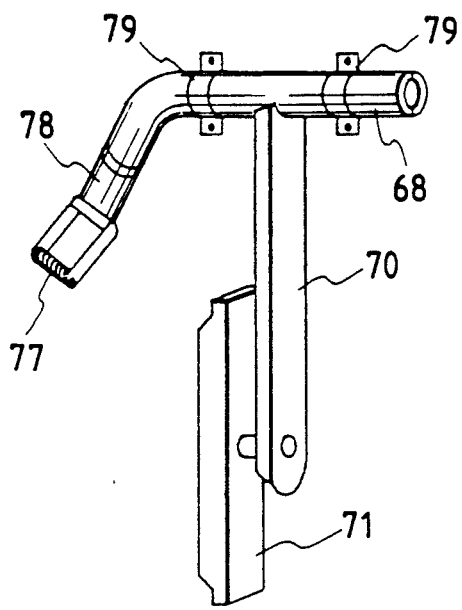
FIG. 14 is a perspective view of a transmission cable guide shown in FIG. 13.

The above-described transmission cable termination box using polyvinyl-chloride-covered optical fiber cable 2 mm in diameter was constructed as described below with reference to FIGS. 13(A), 13(B), and 14. A plastic winding barrel 64 was formed having a 6 cm barrel diameter with flanges 65 14 cm in outside diameter and 2 cm in width. A transmission cable guide fixing part 71 was secured to the inside of the winding barrel 64. A transmission cable guide 68 was rotatably attached to the transmission cable guide fixing part 71 through an arm 70 provided outside the flanges 65 of the winding barrel 64. The transmission cable guide 68, rotatable around the central axis of the winding barrel 64, formed a circular locus 7.5 cm in radius. As shown in FIG. 14, the transmission cable guide 68 of cylindrical form was provided with a roller 77 to depress the transmission cable 61 onto the winding barrel 64. Roller 77 prevents transmission cable arrangement disorder of transmission cable 61 and loosening thereof. A roller retaining spring 78 pushes the roller 77 towards the winding barrel 64. The width of the roller 77 was 1.8 cm, slightly smaller than the width of the flanges 65. The transmission cable guide 68 was then split into two halves along its longitudinal axis for detachably engaging it with the transmission cable 61. In FIG. 14, reference numeral 79 designates metal parts for combining the halves of the transmission cable guide 68 together. More specifically, the metal parts 79 were used as follows: After the transmission cable 61 was inserted into the transmission cable guide 68 in such a manner that it was laid between the two halves of the transmission cable guide 68, the metal parts 79 were tightened together forming the cylindrical transmission cable guide 68. To remove transmission cable guide 68, the metal parts 79 were removed and the transmission cable guide 68 was split into the two halves. In this condition, the transmission cable fixing part 71 was then removed from the winding barrel. As a result, the transmission cable guide 68 could be easily removed from the transmission cable 61.

The termination box thus formed was used to accommodate the above-described transmission cable 61 having a length of 70 m: First, in order to eliminate the possibility that the transmission cable 61 might bend at an acute angle, the lower end terminal 63 was led through the lower end hole, located obliquely to the inside of the winding barrel 64, and secured. Thereafter, the winding barrel 64 was secured. Next, the transmission cable guide 68, as shown in FIG. 14, was connected to the winding barrel 64 as shown in FIG. 13(A). The transmission cable guide 68 thus connected was split into two halves to receive the transmission cable 61 therein. The two halves were secured together using metal parts 79.

Next, the operator rotated the transmission cable guide 68 clockwise around the central axis of the winding barrel 64 to wind the transmission cable 61 onto the winding barrel 64. The transmission cable 61 was wound on the winding barrel 64 in five minutes. During this cable winding operation, with the aid of the retaining roller 77, the transmission cable 61 was uniformly distributed between the flanges 65 of the winding barrel 64. Therefore the layer of the transmission cable 61 thus wound was substantially uniform in thickness. Furthermore, in this operation, transmission cables connected to the upper and lower ends of the wound transmission cable were not cut, and the possibility of a loss of transmission did not increase.

After the transmission cable 61 was wound on the winding barrel 64 in the above-described manner, a sponge was put on the winding barrel 64 in all directions to prevent loosening of the transmission cable 61. Then the transmission cable guide 68 and other jigs were removed, leaving only the small diameter winding barrel 64 and the wound transmission cable 61. Thus, the 70 m of accommodated transmission cable 61 was considerably compact.

Upon removal of the sponge, a person stood at a distance of 1 m from the winding barrel 64 in the direction of the winding barrel axis, and drew the transmission cable 61 therefrom. The transmission cable 61 was let out, shifting its position around the barrel's flange 65, while eliminating the twist given to it when wound. The drawing out of the 70 m of transmission cable 61 was accomplished in three minutes.

Figure 15:
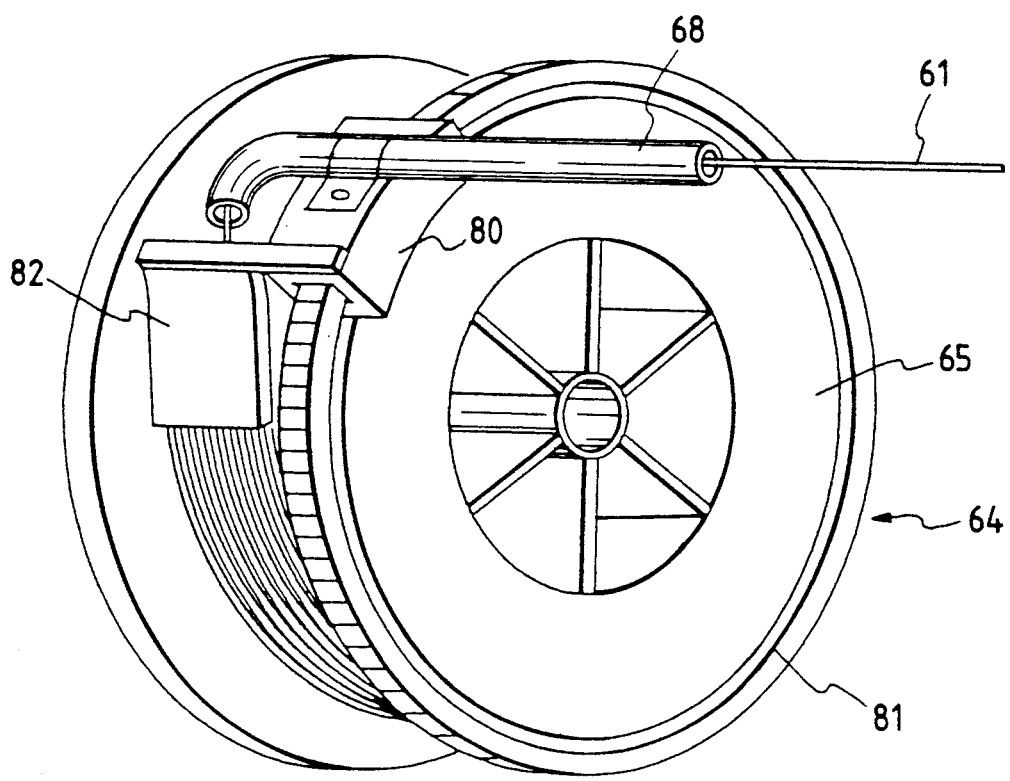
FIG. 15 is a perspective view showing a fifth embodiment of the present invention.

FIG. 15 is a perspective view of a fifth embodiment of the present invention. In FIG. 15, reference numeral 61 designates a transmission cable; 64, a winding barrel;

65, flanges; 68, a transmission cable guide; 80, a circulating member; 81, a guide rail; and 82, an elastic board. In the termination box, the guide rail 81 is formed on the periphery of one of the flanges 65 of the winding barrel 64, and the circulating member 80 with the transmission cable guide 68 is allowed to move circularly on the guide rail 81. The guide rail 81 may be formed by forming grooves on both sides of a flange 65. Thus, a simple structure may be employed for installing the transmission cable guide 68.

The elastic board 82 is provided to retain and prevent loosening of the wound transmission cable 61. It is preferable to form the elastic board 83 of rubber or the like.

Figure 16A:
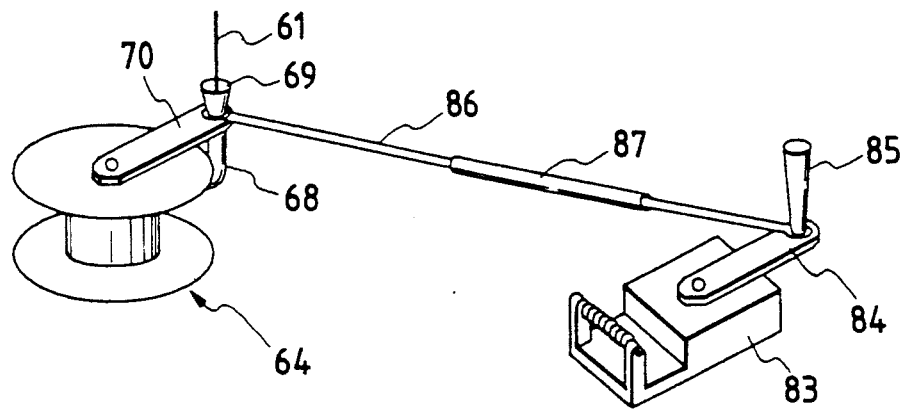
FIGS. 16(A) and 16(B) are explanatory diagrams showing a sixth embodiment of the present invention.
Figure 16B:
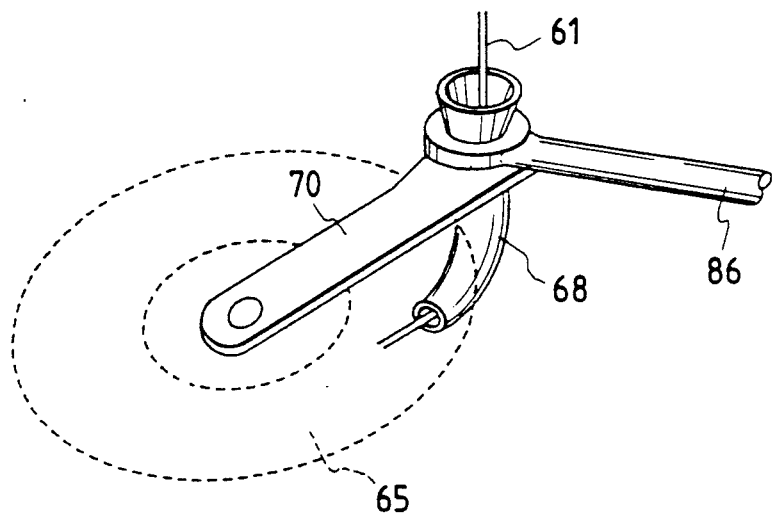

FIGS. 16(A) and 16(B) are diagrams for describing a sixth embodiment of the present invention. More specifically, FIG. 16(A) is a perspective view outlining the arrangement of the embodiment, and FIG. 16(B) is also a perspective view showing essential components of the embodiment. In FIGS. 16(A) and 16(B), reference numeral 61 designates a transmission cable; 64, a winding barrel; 65, flanges; 68, a transmission cable guide; 69, a transmission cable guide inlet; 70, an arm; 83, a drive section; 84, a crank arm; 85, a handle; 86, a crank and 87, a crank length adjusting part. In the embodiment shown in FIGS. 16(A) and 16(B), the crank arm 84 coupled to the drive section 83 is turned manually with the handle 85. The torque of the crank arm 84 is transmitted through the crank 86 to the arm 70 causing the transmission cable guide 68 to rotate around the central axis of the winding barrel 64. As a result, the transmission cable 61 is wound on the winding barrel 64 while being drawn through the transmission cable guide 68.

In the embodiment thus constructed, the length of the crank 86 can be adjusted using the crank length adjusting part 87. Hence, even when the winding barrel 64 is used where the work is rather difficult, the transmission cable guide 68 can be operated with ease.

The transmission cable guide 68 may be driven using an electric device, such as an electric motor. For instance, when the termination box is set in an inconveniently high position, it is preferable to drive the transmission cable guide 68 using a high efficiency electric motor. Furthermore, it is preferable to use an infrared controller or the like to control remotely the transmission cable guide 68.

It is also preferable to provide a traverse mechanism for uniformly winding the transmission cable 61 on the winding barrel 64 by reciprocating either the winding barrel 64 or the transmission cable guide 68 along the central axis of the winding barrel.

Figure 17:
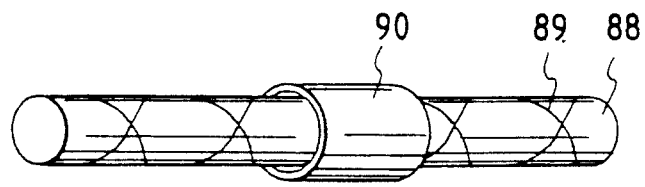
FIG. 17 is an explanatory diagram showing an example of a traverse mechanism.
Figure 18:
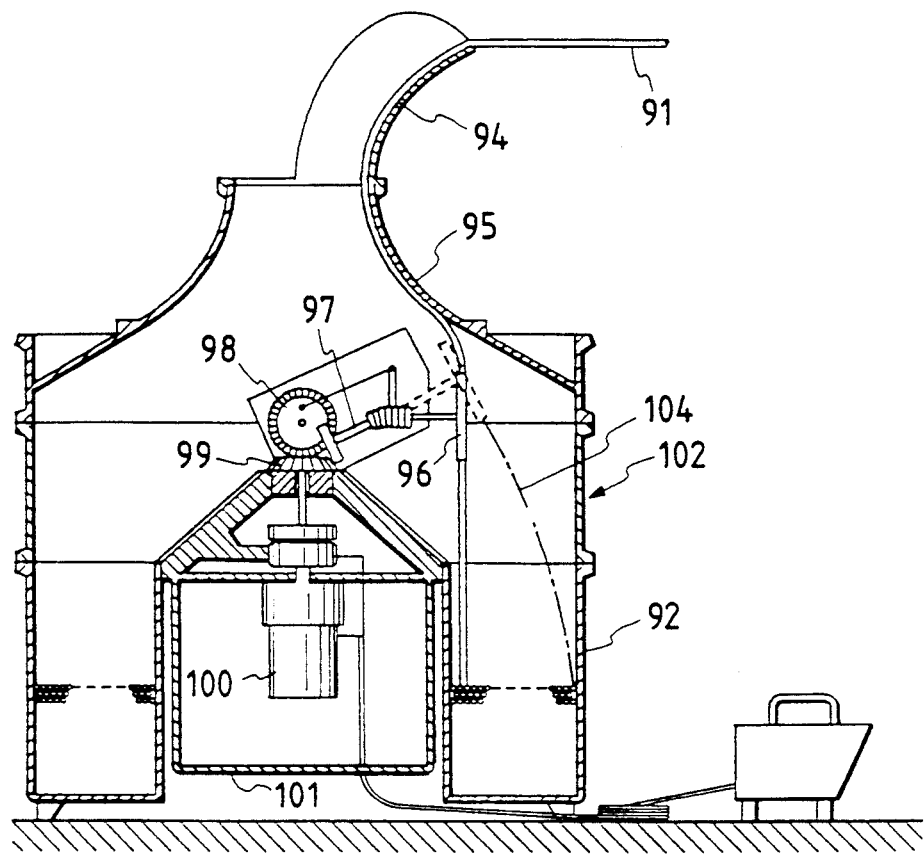
FIG. 18 is an explanatory diagram showing how a transmission cable is drawn into a transmission cable accommodating unit in the prior art.
Figure 19:
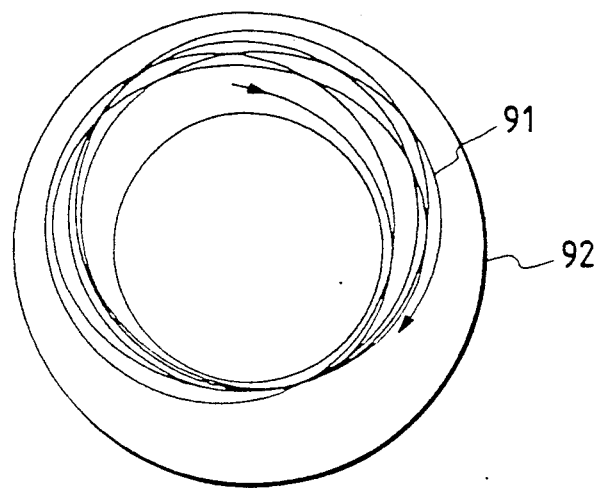
FIG. 19 is an explanatory diagram showing the transmission cable accommodated in the transmission cable accommodating unit shown in FIG. 18.
Figure 20:
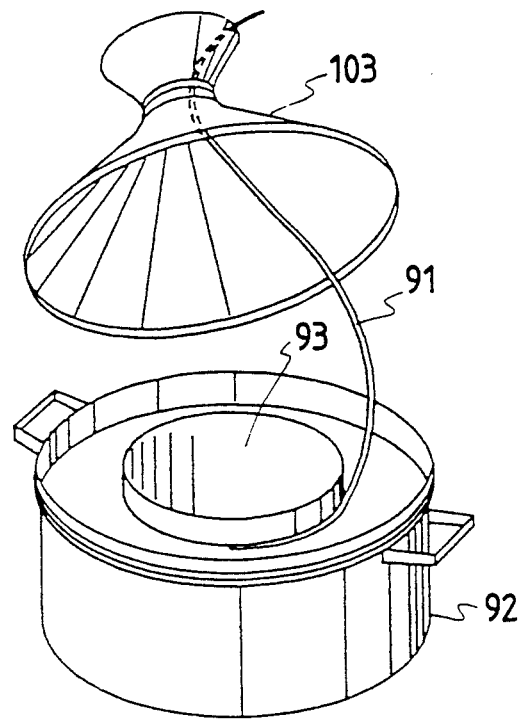
FIG. 20 is an explanatory diagram showing the transmission cable being drawn out of the transmission cable accommodating unit shown in FIG. 18.

FIG. 17 shows one example of a drive shaft employed as a traverse mechanism. Spiral grooves 89 are formed in a rotary shaft 88 in opposite directions and are connected to inform one spiral groove. An outer cylinder 90 mounted on the rotary shaft 88 has a non-rotatable guide pin (not shown) engaged with the spiral groove. Hence, as the rotary shaft 88 is rotated, the outer cylinder 90 reciprocates and causes, for instance, the outlet of the transmission cable guide to traverse between the flanges 65 of the winding barrel 64. Thus, the transmission cable 61 is wound in alignment. Likewise, the traverse mechanism may cause the winding barrel to reciprocate along the central axis. The employment of the traverse mechanism is advantageous because the transmission cable can be wound on the winding barrel 64 without adverse affects, and the transmission cable 61 thus wound does not become loose.

In the above-described embodiment, the transmission cable guide 68 is cylindrical; however, it should be noted that the invention is not limited thereto or thereby. For instance, the transmission cable guide may be in the form of a roller or ring. That is, any other means may be employed which can direct the transmission cable 61 towards the central axis of the winding barrel 64 and lead it between the winding barrel's flanges 65.

Where the winding barrel is left outside for a long period of time, it is preferable to put a cover on it. This is effective in preventing the transmission cable from being deteriorated by external forces or sun light.

With the termination box according to the present invention, a long transmission cable can be accommodated compactly. Hence, the terminal box can be used for storage or transportation of a transmission cable as well as for accommodating an extra length of transmission cable.

Since the smaller the diameter of the winding barrel becomes the higher the efficiency of accommodation, it is preferable to reduce the diameter of the winding barrel as much as possible. However, in the case where an optical cable is to be wound on the winding barrel, the reduction of the diameter of the winding barrel is limited. The optical cable is wound on the winding barrel while being twisted once per revolution (i.e. the optical cable is twisted), thus causing a loss of transmission. It has been confirmed that, when a single mode optical fiber is wound on a winding barrel having a diameter 25 mm or less, the loss of transmission increases at least 0.02 dB/50 m with a 1.55 $\mu$m band. The transmission loss increase cannot be disregarded for a long transmission cable. Hence, it is preferable to provide a winding barrel having a diameter of at least 25 mm for an optical fiber cable having a diameter of up to 4 mm.

As is apparent from the above description, with the termination box of the present invention, a transmission cable such as a copper wire or optical fiber can be readily wound and unwound at a work site. The termination box is effective in dealing with an extra length of transmission cable, is low in manufacturing cost, and is easily maintained. Furthermore, the termination box simplifies installation of a transmission cable with a strength wire.

Fixed to a building or the like may be only the winding barrel small in size and low in manufacturing cost. With a simple jig coupled to the winding barrel, even a long extra length of transmission cable can be accommodated readily. This is effective in dropping an optical fiber transmission cable for a subscriber.

Furthermore, the jigs, for instance a transmission cable guide, are separable from the winding barrel, and can be used for a plurality of winding barrels. Thus, the termination box is very economical.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A method of installing a transmission cable on a strength wire, wherein said transmission cable is stored on a stationary winding barrel of a termination apparatus, the method comprising the steps of:

passing a first end of said transmission cable outside said termination apparatus via a transmission cable guide;

connecting said first end of said transmission cable to a transmission supply point;

passing an end of a strength wire, supplied by a strength wire barrel positioned behind said termination apparatus, through said termination apparatus via a strength wire supplying hole along a central axis of said stationary winding barrel;

retaining said end of said strength wire at said transmission supply point;

moving said termination apparatus and strength wire barrel to a transmission receiving point so that said transmission cable unwinds from said stationary winding barrel onto said strength wire;

cutting said strength wire at a point before said strength wire enters said termination apparatus and removing strength wire barrel;

retaining a cut end of said strength wire connected to said transmission supply point at said transmission receiving point; and connecting a second end of said transmission cable to said transmission receiving point.

2. A method of installing at least a first and second transmission cable from a first and second termination apparatus, respectively, wherein said first transmission cable is stored on a first stationary winding barrel of said first termination apparatus and said second transmission cable is stored on a second stationary winding barrel of said second termination apparatus, the method comprising the steps of:

arranging in series said first and second termination apparatuses to align a central axis of said first stationary winding barrel of said first termination apparatus with a central axis of said second stationary winding barrel of said second termination apparatus;

passing first ends of said first and second transmission cables outside said first and second termination apparatuses via respective transmission cable guides;

connecting said first ends of said first and second transmission cables to a transmission supply point;

passing an end of a first strength wire, supplied by a first strength wire barrel positioned behind said second termination apparatus, through strength wire supplying holes passing through said central axes of said second and first termination apparatuses;

retaining said end of said first strength wire at said transmission supply point;

moving said first and second termination apparatuses and said first strength wire barrel near a first transmission receiving point so that said first and second transmission cables unwind from said first and second stationary winding barrels onto said first strength wire;

cutting said first strength wire at a point where said first strength wire exits said strength wire supplying hole of said first termination apparatus forming first and second cut ends;

removing said first strength wire extending from said first strength wire barrel from said first termination apparatus;

passing an end of a second strength wire, supplied by a second strength wire barrel positioned behind said first termination apparatus, through said strength wire supplying hole passing through said central axis of said first termination apparatus;

reconnecting said first and second cut ends;

connecting said end of said second strength wire to said reconnected first and second cut ends;

moving said first termination apparatus and said second strength wire barrel to said first transmission receiving point so that said first transmission cable unwinds from said first stationary winding barrel onto said second strength wire;

cutting said second strength wire at a point before said second strength wire enters said strength wire supplying hole of said first termination apparatus and removing said second strength wire barrel;

retaining a cut end of said second strength wire connected to said first strength wire at said first transmission receiving point;

connecting a second end f said first transmission cable to said first transmission receiving point;

moving said second termination apparatus and said first strength wire barrel to a second transmission receiving point so that said second transmission cable unwinds from said second stationary winding barrel onto said first strength wire;

cutting said first strength wire at a point before said first strength wire enters said strength wire supplying hole of said second termination apparatus and removing said first strength wire barrel;

retaining a cut end of said first strength wire connected to said transmission supply point at said second transmission receiving point; and connecting a second end of said second transmission cable to said second transmission receiving point.

* * * * *